United States Patent [19]

Flood

[11] 3,944,090

[45] Mar. 16, 1976

[54] METHOD FOR LOADING GRAIN CARS
[75] Inventor: Donald S. Flood, Maidstone, Canada
[73] Assignee: Robert J. Flood, Maidstone, Canada; a part interest
[22] Filed: Oct. 4, 1974
[21] Appl. No.: 512,089

[52] U.S. Cl. ............... 214/152; 141/35; 141/256; 141/387; 193/3; 198/66; 214/16 R; 214/41 R
[51] Int. Cl.² .................. B65G 67/06; B65G 67/20
[58] Field of Search ........... 214/16 R, 17 C, 17 CA, 214/41, 152; 198/66, 169; 141/35, 256, 257, 387; 193/3, 15, 16, 30

[56] References Cited
UNITED STATES PATENTS

| | | | |
|---|---|---|---|
| 1,439,714 | 12/1922 | Severson | 193/30 X |
| 2,681,639 | 6/1954 | Littlefield | 198/169 X |
| 3,180,318 | 4/1965 | Fisher | 198/169 X |
| 3,365,043 | 1/1968 | Heeren | 193/3 |

*Primary Examiner*—Robert G. Sheridan

[57] ABSTRACT

A system is described for loading grain from an elevator into the multiple compartments of a railway grain tank car. It includes a substantially horizontally extending cylindrical auger tube with power driven auger positioned above the compartments of the car. The tube has a grain receiving opening at one end and grain discharge openings in a lower side above each compartment. A down spout extends downwardly from each discharge opening with the lower end of each spout extending a short distance into the associated compartment. With this arrangement, when the level of the grain in each compartment reaches the lower end of the spout, the spout is left in position so that it fills with grain up to the auger tube thereby automatically stopping any further flow of grain down the spout.

1 Claim, 5 Drawing Figures

METHOD FOR LOADING GRAIN CARS

BACKGROUND OF THE INVENTION

1. Field of the Invention

This invention relates to a method and apparatus for loading compartmented bulk carrier vehicles, such as railway grain tank cars.

2. Description of the Prior Art

In the loading of grain from an elevator to a railroad car, the vehicle is normally parked in a loading shed or an open siding and positioned beneath or adjacent to an overhead grain storage bin from which the grain is delivered to the box of the vehicle by means of a spout or chute of various well-known designs and familiar to those skilled in the art. In the past, much grain was loaded into box cars and various throwing devices were developed for loading through a side opening in the box car, such as that shown in Sinden, Canadian Pat. No. 457,732 issued June 28, 1949. For the loading of open-topped vehicles, a delivery spout arrangement such as that shown in Wenschlag, Canadian Pat. No. 702,863, issued Feb. 2, 1965, has been used.

It has also been known to use horizontal auger arrangements for the delivery of loose particulate material such as grain and one such auger arrangement is described in Thiele, U.S. Pat. No. 3,074,534, issued Jan. 22, 1963. The purpose of the Thiele device was to deliver grain to a plurality of spaced discharge points and it included special closure devices for selectively closing off one or more of the discharge openings.

Recently, there have been developed special railway tank cars for grain and each of these cars has a series of adjacent compartments with each compartment having an inlet hatch in the top of the tank car and a discharge opening in the bottom. While these specially designed tank cars have proven to be excellent for the transportation of grain and are very convenient in terms of their handling at unloading terminals, there have been difficulties encountered in the loading of these tank cars at local grain elevators.

Thus, when a single delivery spout is used, such as that shown in Canadian Pat. No. 702,863, it has necessitated constant watching by an operator so that as each compartment is filled, the flow is shut off and the spout is then moved to a second hatch in the tank car, either by moving the spout or the tank car, for the filling of the next compartment. This has resulted in considerable wasting of time and labour in the loading of these tank cars at local elevators.

With the multiple hatch openings in these tank cars, it would seem to be an obvious answer to make use of a distributing apparatus such as is described in U.S. Pat. No. 3,074,534 and this does solve the problem to a certain extent, but it does not overcome the problem of requiring constant monitoring by an operator to assure that the compartments are all equally filled and at the same time avoiding overflowing of compartments and spilling of grain.

Electrically operated shut-off systems connected with level indicators could certainly be developed which would cut off flow into each compartment as it is filled, but such systems become expensive particularly for small local elevators and are subject to breakdown and expensive expert maintenance.

It is, therefore, the object of the present invention to provide a very simple and inexpensive system for filling all compartments of a tank car without the necessity of continuous monitoring by an operator.

SUMMARY OF THE INVENTION

Thus, the present invention comprises a loading device for loading grain into multiple compartments of a bulk carrier vehicle. The device has a substantially horizontally extending cylindrical auger tube adapted for positioning above the compartments of the carrier and this tube has a grain receiving opening at one end and grain discharge openings in a lower side thereof above each of the compartments. A conveyor auger extends through the tube from the grain receiving end and a rotary drive means is connected to the auger to rotate the latter to displace grain from the grain receiving opening out through the discharge openings in the tube. Down spouts are connected to the discharge openings for delivering grain from the auger tube into the compartments. Each down spout has vertically adjustable a lower portion preferably comprising a plurality of sections telescopically interconnected for relative extensible and retractable movement therebetween. In operation, each telescopic portion is positioned with its lower end within an associated bulk carrier compartment with the lower end of the telescopic portion extending a short distance below the top of the compartment. With this arrangement, when the level of the grain in each compartment reaches the lower end of the spout, the spout fills with grain up to the auger tube and further flow of grain down that spout automatically stops, while flow continues down the remaining spout or spouts.

The total capacity of the tank cars is always known, so that the device can be set in operation to deliver that knwon amount of grain and it will automatically distribute that quantity of grain among the compartments while properly filling each compartment. After the predetermined quantity of grain has been delivered to a tank car, the loading device is shut down and an operator then lifts each telescopic spout portion so that the grain which has collected in the spout flows into the remaining small space in each compartment. After each spout has been cleared in this manner, these spouts are moved away from the tank car so that the car may be removed and another empty car placed in position.

While the telescopic spout portion is particularly simple and easy to use, it will also be understood that the entire down spout or at least a lower portion thereof can be arranged to swing upwardly and downwardly thereby changing the level of the spout outlet. A windlass and cable arrangement can, if desired, be used for raising and lowering the spout.

Usually a person involed in the handling of grain is primarily concerned with problems of grain conduits and spouts becoming pulgged so that usually efforts are directed towards avoiding plugging of conduits. The concept being employed in the present invention, on the other hand, is directly opposite to the usual thinking in that the down spouts are deliberately caused to become plugged with grain as an automatic shut off means.

Certain preferred embodiments of the invention will now be described with reference to the attached drawings in which.

Figure 1:
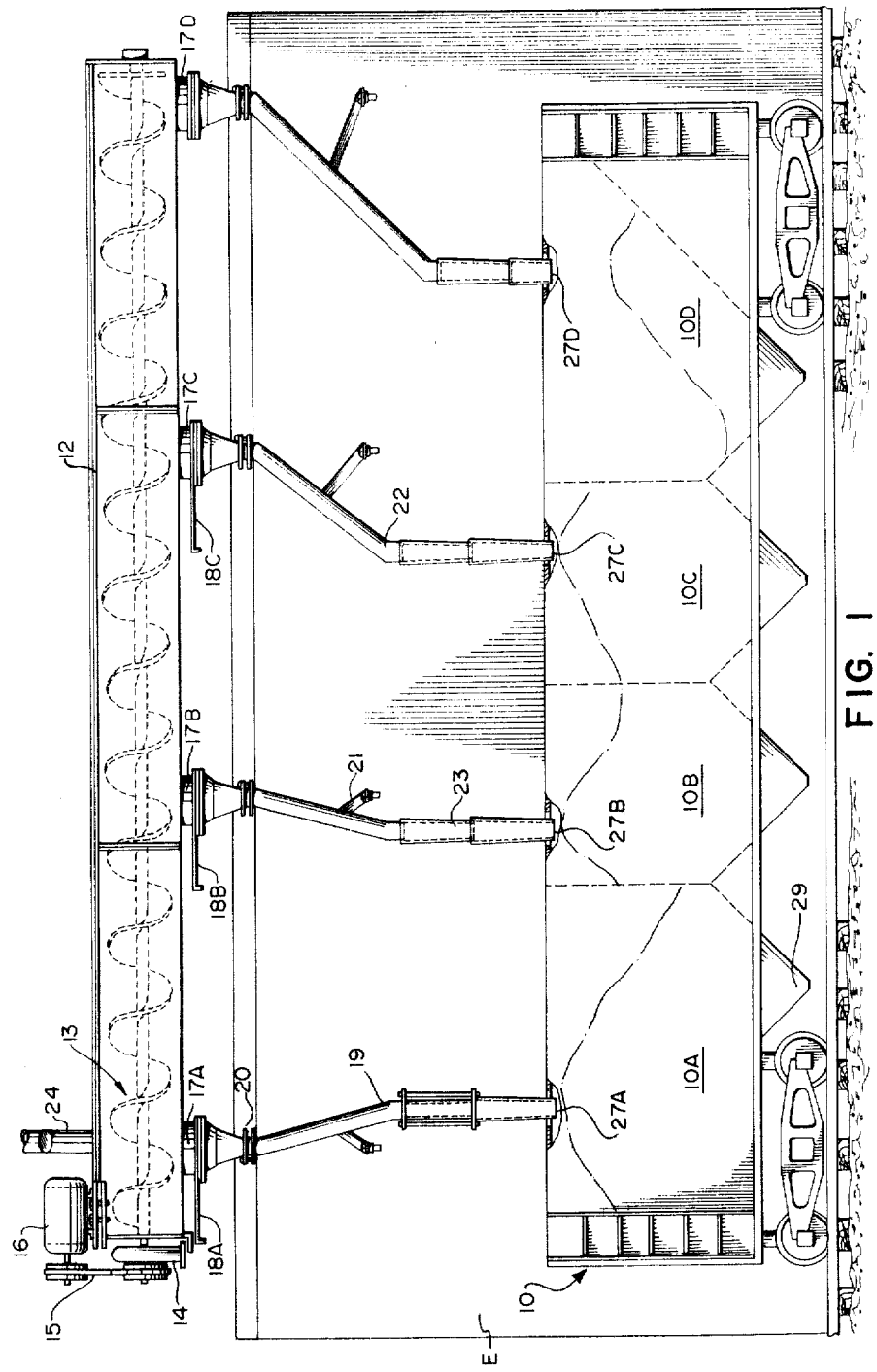
FIG. 1 is a side slevation of a loading device in position over a railway car.
Figure 2:
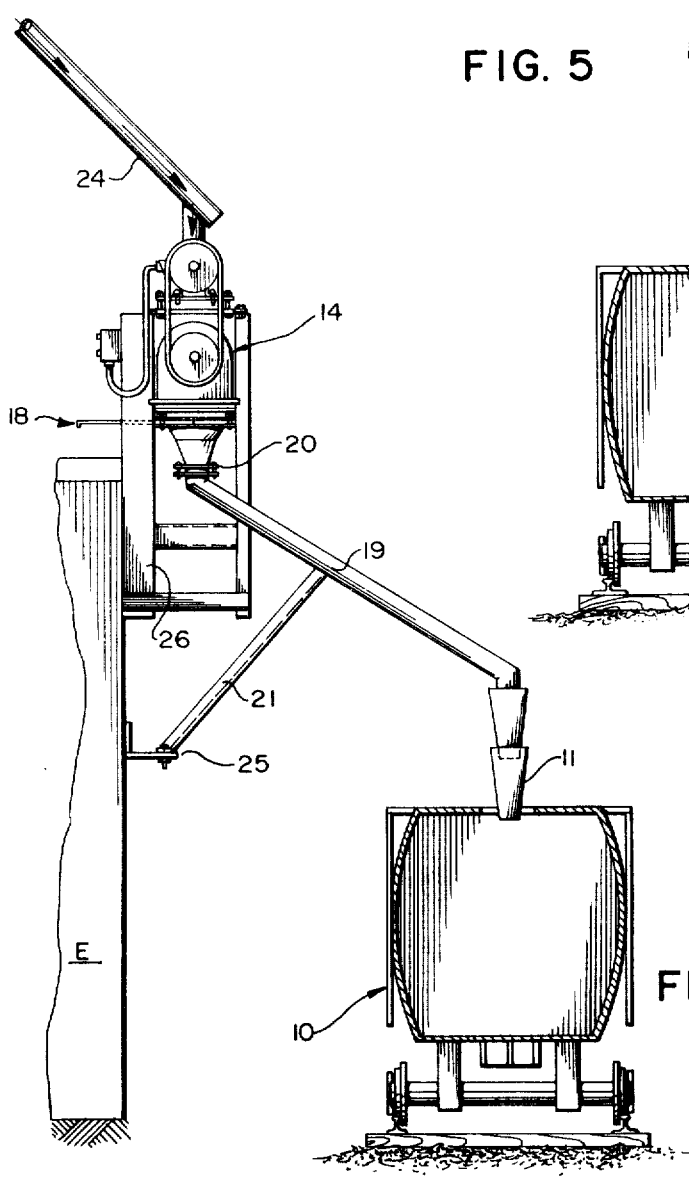
FIG. 2 is an end elevation of the device shown in FIG. 1.
Figure 3:
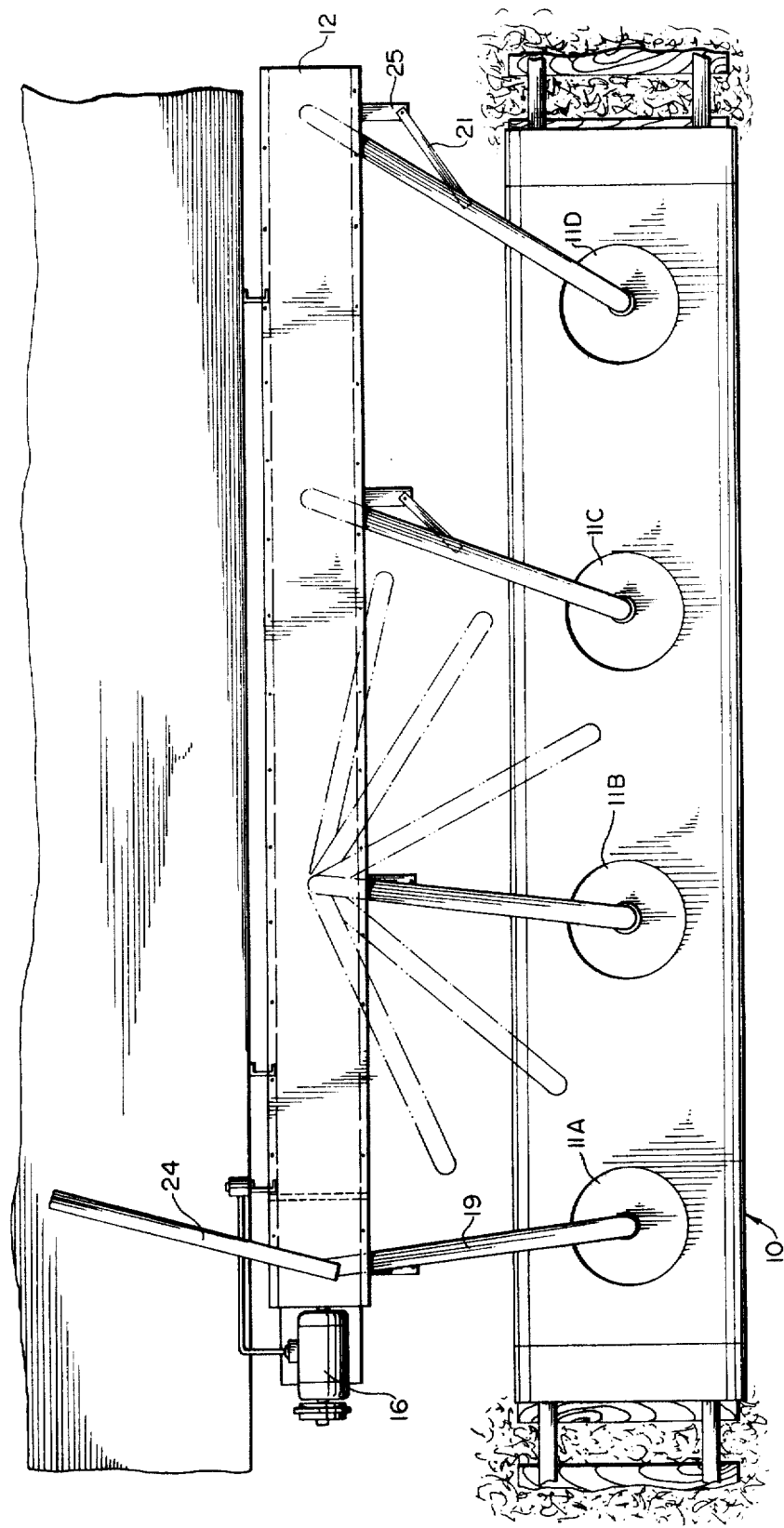
FIG. 3 is a top plan view of the device of FIG. 1.

As will be seen from FIGS. 1, 2 and 3, a railway grain tank car 10 positioned on a rail siding beside a grain elevator E has four grain storage compartments 10a, 10b, 10c and 10d. Each of these compartments is accessible from corresponding hatches 11a, 11b, 11c and 11d in the top of the car while grain is removed at an unloading destination through outlet chutes 29.

Positioned at a location above the top of the car 10 is a cylindrical auger tube 12 containing therein an auger 13. The auger is mounted for rotation in support bearings 14 and is driven by a V-belt 15 from electric motor 16. The auger tube is supported on the side of the elevator building E by means of a framework 26.

Attached to the lower side of auger tube 12 are four grain receiving hoppers 17a, 17b, 17c and 17d and these may optionally have shut-off slides 18a, 18b, 18c and 18d which may be used for an emergency shut down of the device. Inclined down spouts 20 are swingably connected to hopper 17 by means of flange members 20. These permit swinging action of the spouts 19 as shown by the broken lines 19' in FIG. 3.

The inclined spouts 19 are supported by means of angle braces 21 which are connected at their lower ends to support brackets 25 mounted on the side wall of the elevator building E. The lower end of each spout has an elbow 22 and suspended from the elbow 22 are a series of telescopic sections 23 which are telescopically interconnected for relative extensible and retractable movement.

With an empty car 10 in position, the spouts 19 are swung out from the wall of the elevator so that the telescopic portions 23 enter the hatches of the compartments. Each lower telescopic portion end 27a, 27b, 27c and 27d is positioned a short distance below the top wall of a compartment as can best be seen from FIG. 1.

From a storage bin in the elevator building a spout 24 extends downwardly and feeds into one end of auger tube 12.

With the auger in operation, grain is allowed to flow from the elevator bin down spout 24 and into one end of auger tube 12. The auger then carries the grain along the tube with the largest amount initially flowing down hopper 17a and thence into compartment 10a. When the level of the grain in compartment 10a reaches the point where it comes into contact with the lower end 27a of the telescopic portion, the spout is left in position so that the entire spout as well as hopper 17a fill with grain up to the level of tube 12. When this happens, all of the grain being carried by the auger away from spout 24 is carried past the initial hopper 17a with the largest proportion then flowing into hopper 17b. In this manner, each compartment is sequentially filled until all of the grain being carried by the auger is flowing down into hopper 17d. The flow into this hopper then continues until all of the predetermined volume of grain intended for the tank car has been emptied from the elevator bin. This will be an amount no greater than the maximum loading specified for the tank car.

Figure 5:
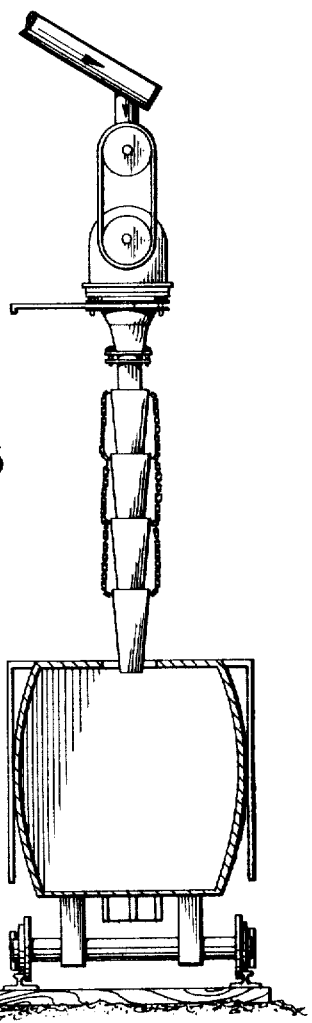
FIG. 5 is an end elevation of the alternative embodiment.
Figure 4:
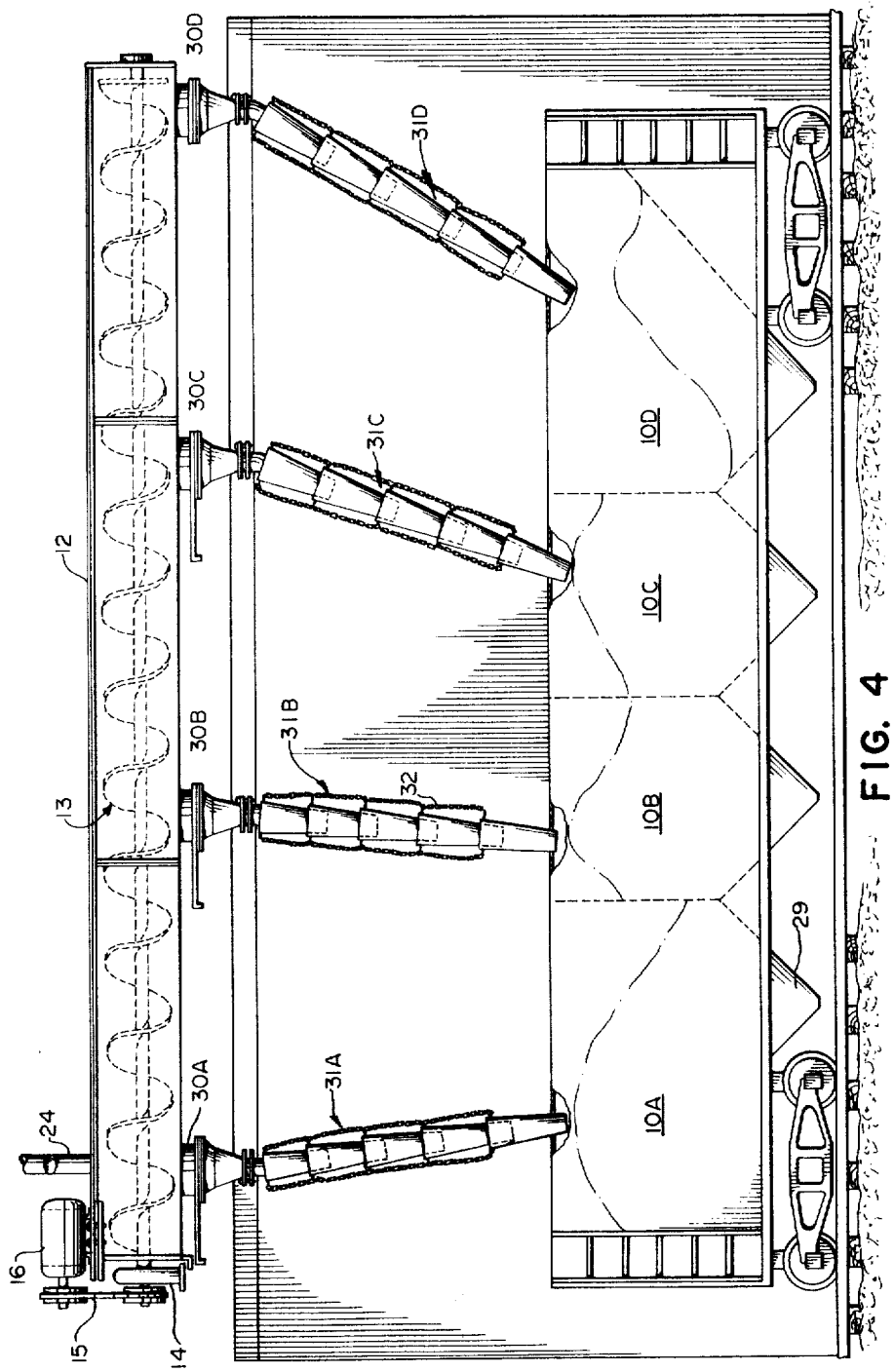
FIG. 4 is a side elevation showing an alternative embodiment.

The embodiment shown in FIG. 4 and 5 is particularly useful for loading grain tank cars in a loading shed. With this the auger tube 12 is positioned directly above the siding and can be mounted from the ceiling of the shed. Again, this tube is provided with grain outlet hoppers 30a, 30b, 30c and 30d which corresponding with tank car compartments 10a, 10b, 10c and 10d. Extending downwardly from hoppers 30a, 30b, 30c and 30d are extensible and retractable telescopic spouts 31a, 31b, 31c and 31d. The individual parts are joined by elastic members 32.

As shown in FIG. 4, a tank car 10 has been positioned in the shed and the telescopic spouts 31a, 31b, 31c and 31d have all been pulled down and fixed in operating position. Thus, when the tank car is positioned, the operator opens the hatches and pulls down the spouts, hooking each spout within a hatch opening so that the lower end of each spout extends a short distance into each compartment as shown, e.g. about 6 inches.

In this view, compartments 10a and 10b are already full and the spouts 31a and 31b are being kept in operating position so that they continue to serve as automatic shut-off members. Most of the flow is coming down the spout 31c into compartment 10c and when it is filled, all of the flow will then switch to spout 31d into compartment 10d. When all of the predetermined amount of grain has been loaded into the tank car in this manner, the device is shut down. Then the operator unhooks each spout and allows it to lift slightly so that all of the grain being held in the spout flows into the small space left at the top of the corresponding compartment. When each spout is empty it is allowed to fully retract under the action of spring 32. With all of the spouts retracted and the hatches closed, the loaded tank car is moved and replaced by an empty car and the sequence is then repeated.

I claim:

1. A method for loading grain into multiple compartments of a bulk carrier vehicle, said method comprising: positioning a substantially horizontally extending cylindrical auger tube at a location above said compartments, said tube having a grain receiving opening at one end thereof and having grain discharge openings in the lower side thereof above each compartment, each discharge opening having connected thereto a down spout for delivering grain from the auger tube into said compartments, positioning said down spouts such that the lower end of each extends a short distance into an associated compartment, feeding grain from a grain elevator into said auger tube receiving opening, rotating an auger within said tube to displace the grain along the tube away from the receiving opening and into said down spouts to load the compartments, continuing the loading such that as each compartment is filled to the level of the bottom of the associated down spout, the spout is left in position whereby the spout fills with grain up to the auger tube thereby precluding any further discharge of grain into the compartment while the discharging continues into the remaining compartment or compartments, this loading being continued until an amount of grain no more than the maximum specified load for the vehicle has been loaded, thereafter with no grain being fed to the auger tube, lifting the lower end of each down spout to allow the grain plugging each spout to flow into the associated compartments, and removing the emptied spouts.

* * * * *